United States Patent [19]

De Leon

[11] 4,394,544
[45] Jul. 19, 1983

[54] LINE CIRCUIT FOR MULTIPLE LINE TELEPHONE

[75] Inventor: Daniel De Leon, Santa Ana, Calif.

[73] Assignee: GTE Automatic Electric Labs Inc., Northlake, Ill.

[21] Appl. No.: 319,563

[22] Filed: Nov. 9, 1981

[51] Int. Cl.³ .................. H04M 1/72; H04M 9/00
[52] U.S. Cl. ..................... 179/99 H; 179/99 LC; 179/94; 179/81 C
[58] Field of Search ............ 179/99 LC, 99 LS, 99 H, 179/94, 18 BE, 81 C, 84 L

[56] References Cited

U.S. PATENT DOCUMENTS 4,093,830 6/1978 Pappas .................. 179/99 LC

Primary Examiner—Stafford D. Schreyer
Attorney, Agent, or Firm—Robert J. Black; Gregory G. Hendricks

[57] ABSTRACT

A line circuit which allows a multiple line telephone to operate like a private branch exchange (PBX) telephone. Solid state hold and flashing circuits drive a light emitting diode in each telephone connected to the same line.

9 Claims, 1 Drawing Figure

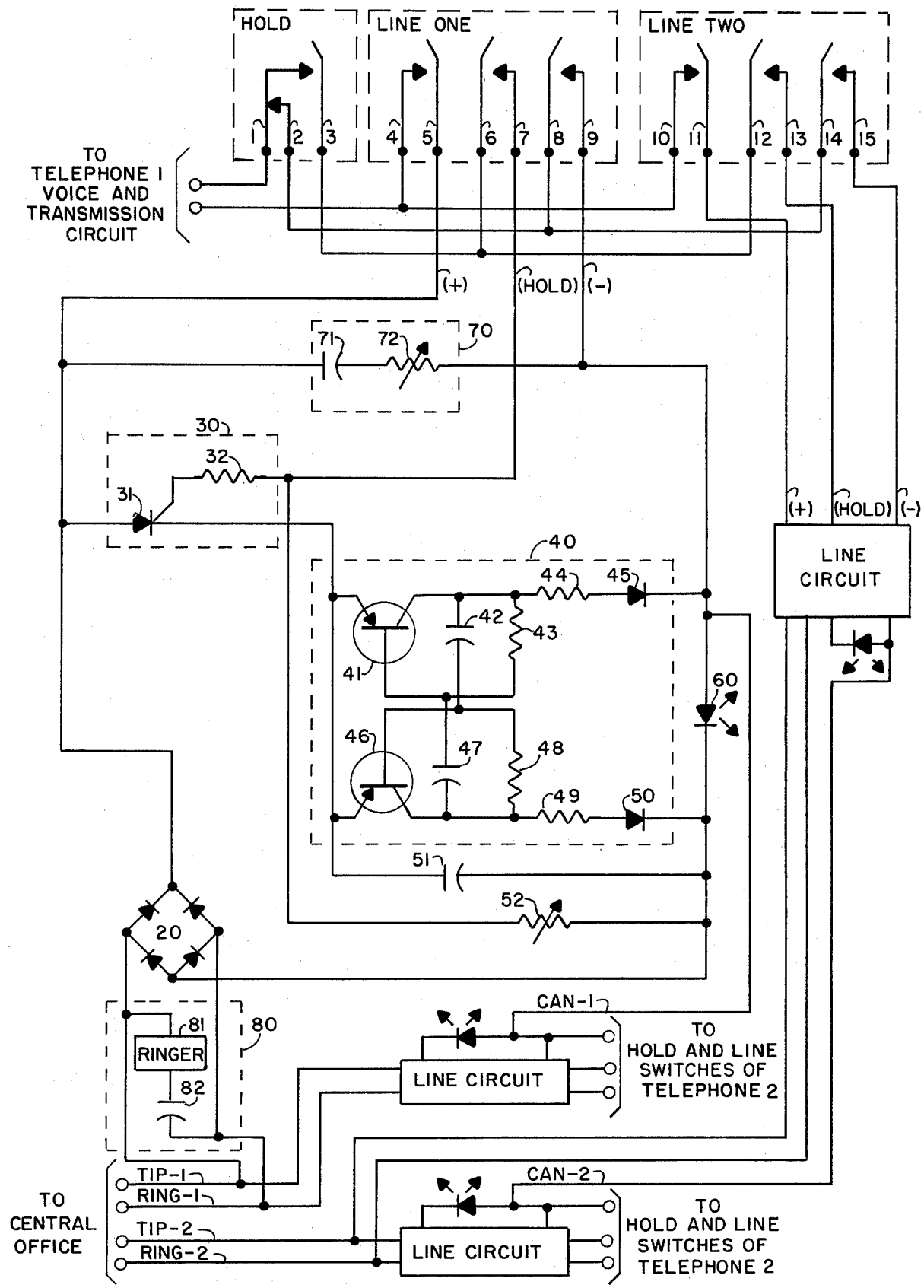

LINE CIRCUIT FOR MULTIPLE LINE TELEPHONE

BACKGROUND OF THE INVENTION (1) Field of the Invention

The present invention relates to telephone substation instruments and more particularly to a line circuit for multiple line telephone substations.

(2) Description of the Prior Art

Two-line telephones are old and well known, as are Private Branch Exchange (PBX) telephones, but, two-line telephones do not provide the common lamp signaling features that are available with PBX telephones. While PBX telephones do provide these common signaling features, they do so at the cost of complex line circuitry.

Accordingly, it is the object of the present invention to provide a novel arrangement of a multiple line telephone which includes the common signaling features of a PBX telephone without the cost of the complex and expensive circuitry required for such telephones.

SUMMARY OF THE INVENTION

The present invention discloses a novel arrangement for implementing PBX line signaling features in a multiple line telephone. Each telephone connected to the same line includes a light emitting diode (LED) whose anode is connected to the anode of the LED of each other telephone associated with the same line. Thus lamp signals applied to the LED of any telephone connected to a given line will be applied to the LED's of each other telephone connected to the same line.

A silicon controlled rectifier (SCR) is connected across the tip and ring leads of each telephone in order to provide the hold function. This SCR operates in response to the hold button and remains operated until the associated telephone goes off hook.

A switching circuit is connected between the SCR and the LED of each telephone in order to cause the LED to flash when a telephone is in the hold condition.

A ringing capacitor is also connected across the tip and ring leads. This capacitor allows the LED to also flash in response to application of ringing current.

DESCRIPTION OF THE DRAWING

The single FIGURE of the accompanying drawing is a schematic diagram of a line circuit for a multiple line telephone in accordance with the present invention.

DESCRIPTION OF THE PREFERRED EMBODIMENT

Referring now to the accompanying drawing, the line circuit for a multiple line telephone of the present invention, is shown connected to a telephone central office.

The drawing shows two line circuits implemented in each telephone substation. Since both line circuits are identical, only the line circuit associated with line 1 is described herein.

The inputs of bridge rectifier 20 are shown connected to the tip-1 and ring-1 leads while the outputs of bridge rectifier 20 are shown connected hold circuit 30, switching circuit 40, Light Emitting Diode (LED) 60, shunt circuit 70 and the switches associated with line 1. The inputs of bridge 20 are also shown connected to ringer circuit 80.

The line circuit of the subject invention allows a multiple line telephone with a hold feature to operate as a PBX system phone. This phone includes two line buttons, corresponding visual indicators and a hold button.

When the multiple line telephone is in use, the LED corresponding to the line being used, lights up on all such telephones connected to the same line. When the hold feature is used, the LED associated with the line on hold flashes on all telephones connected to that line. Similarly when the telephone is rung, the line LED flashes in response to the ringing signal.

LED 60 in the line circuit connected to line 1 and telephone 1 is in parallel with the LED of the line circuit of each telephone connected to line 1. The cathode of each LED is connected to the corresponding ring lead while the anode of each LED is connected to the common anode (CAN) lead.

When a telephone connected to line 1 is used, the positive potential on the tip-1 lead is applied to light emitting diode 60 via diode bridge 20, operated line button contacts 4 and 5, hold contacts 1 and 2, and operated line button contacts 8 and 9. This positive potential is then applied to all of the anodes connected to line 1 via common anode lead CAN-1. Thus the line 1 LED is lit on all phones connected to line 1 when the line 1 button of any such off-hook telephone is operated.

Hold circuit 30 includes silicon controlled rectifier (SCR) 31 connected to gate resistor 32. When the hold button is depressed, the positive potential on the tip-1 lead is applied to the anode of SCR 31 via diode bridge 20. This positive potential is also applied to the gate of SCR 31 via operated line button contacts 4 and 5 hold button contacts 1 and 3, operated line button contacts 6 and 7 and gate resistor 32. This positive potential applied to the gate of SCR 31 causes it to conduct current and thereby apply the positive tip potential to LED 60 via switching circuit 40.

When the phone is placed on-hook, SCR 31 continues to conduct thus holding the line connection by shorting the tip-1 and ring-1 leads. Under such conditions a visual indication that a line is in the hold condition is available from LED 60 via SCR 31.

When the telephone receiver goes off-hook a surge in current goes through the telephone, breaking the current path to the gate of SCR 31, thereby opening SCR 31 and returning the line to its normal operating condition by removing the shunt provided by SCR 31. Consequently LED 60 is extinguished.

However, in order to distinguish between normal operating conditions and hold conditions the hold condition is indicated by a flashing LED while the line operated condition is indicated by a steady visual indication from LED 60. Switching circuit 40 provides the flashing hold indication since it is connected in series with SCR 31 and thus operates only under the hold condition. Switching circuit 40 operates to alternately apply current from the cathode of SCR 31 to the anode and cathode of LED 60. Thus LED 60 is lit when current from the cathode of SCR 31 is applied to the anode of a LED 60 and it is extinguished when that current is shunted to the cathode of LED 60.

Switching circuit 40 is an astable multivibrator. It includes transistors 41 and 46, capacitors 42 and 47, resistors 43, 44, 48, and 49, and diodes 45 and 50. The flashing operation results from transistors 41 and 46 alternately conducting current.

When current flows through the emitter and collector of transistor 41 it applies a positive potential to the base of transistor 46 thereby turning it off. However since current is flowing through transistor 41 it also flows through LED 60 and causes it to light. Once capacitor 42 charges up, the positive potential is removed from the base of transistor 46 allowing current to flow through its emitter and collector. Thus current is shunted from LED 60 and it is extinguished. While transistor 46 conducts, current flows through capacitor 47, thereby applying a positive potential to the base of transistor 41 and turning it off. Similarly, transistor 41 will remain turned off until capacitor 47 charges up, at which time transistor 41 will again conduct current to LED 60 and cause it to light.

Bias resistor 52 maintains a negative potential on the gate of SCR 31 thereby insuring that the hold condition exists only when the positive potential is applied to resistor 32 via hold contacts 1 and 3. The value of this resistor varies in each circuit according to the characteristics of SCR 31.

Shunt capacitor 51 operates to reduce clicking when the hold feature is used, and it also makes SCR 31 very sensitive since when the hold button is depressed the SCR appears to be connected across the tip and ring leads until capacitor 51 charges up. This capacitor also insures that the hold shunt is removed from the line when the telephone receiver is lifted. When current surges through the telephone in response to the receiver going off-hook, capacitor 51 applies discharging back pressure potential to SCR 31. Also, when current thus surges through the telephone it is diverted from the gate of SCR 31. This removal of gate current and application of cathode back pressure potential causes SCR 31 to turn off and thereby remove the hold shunt.

Shunt circuit 70 provides for a visual indication of the ringing signal. After bridge 20 changes the ringing signal to a pulsating direct current signal, capacitor 71 passes this pulsating direct current potential to LED 60 which then flashes at twice the frequency of the ringing signal. Variable resistor 72 prevents capacitor 71 from interfering with the line under normal operating conditions by limiting the current through shunt circuit 70. It also limits the pulsating direct current through LED 60 so that there will be sufficient ringing current left to ring bell ringer 81.

Ringing circuit 80 includes bell ringer 81 and capacitor 82 connected across the tip and ring leads. Capacitor 82 only passes alternating ringing current such that the ringer is operated only in response to such alternating ringing current.

Thus the present invention enables a multiple line telephone to operate as a PBX telephone through use of a novel line circuit for each line. This novel line circuit includes an SCR hold circuit, a flasher circuit and a light emitting diode for each line.

It will be obvious to those skilled in the art that numerous modifications of the present invention have been made without departing from the spirit of the invention which shall limited only by the scope of the claims appended hereto.

What is claimed is:

1. A plurality of line circuits in a multiple line telephone having a line switch for each line, and a hold switch for all lines, each of said line circuits connected to a telephone switching system via an associated line, said telephone switching system operated to apply alternating current ringing signal and loop current to a selected one of said lines, each of said line circuits comprising:
a loop holding circuit connected to an associated line and said hold switch;
a switching circuit connected to said holding circuit; and
visual indicating means connected to said switching circuit;
one of said line switches for each line operated to connect said visual indicating means to said line;
whereby said loop current flows through said line switch and said visual indicating means;
said visual indicating means operated in response to said loop current to generate a steady visual signal;
said hold switch operated to generate a holding circuit enable signal and further generated to release said operated line switch;
said holding circuit operated in response to said enable signal to conduct said loop current to said switching circuit;
said switching circuit operated in response to said loop current to periodically, alternately apply and shunt, said loop current to and from said visual indicating means;
said visual indicating means operated in response to said periodically applied loop current to generate a periodic visual signal of a first characteristic.

2. A line circuit as claimed in claim 1, wherein: there is further included rectifying means connected between said associated line and said holding circuit, operated by said ringing signal to provide a unipolarity ringing signal for energizing said visual indicating means.

3. A line circuit as claimed in claim 1, wherein: there is further included shunting means, connected across said holding circuit and said switching circuit, operated to apply a predetermined portion of said ringing signal to said visual indicating means;
said visual indicating means operated in response to said applied ringing signal to generate a periodic visual signal of a second characteristic.

4. A line circuit as claimed in claim 3, wherein: said shunting means comprise a capacitor connected to a resistor.

5. A line circuit as claimed in claim 1, wherein: said holding circuit comprises:
a silicon controlled rectifier having an anode connected to said line, a cathode connected to said switching circuit and a gate connected to said hold switch.

6. A line circuit as claimed in claim 5, wherein: said holding circuit further comprises a resistor connected between said gate of said silicon controlled rectifier, and said line operated to provide a negative bias to said gate.

7. A line circuit as claimed in claim 1, wherein: said holding circuit further comprises a capacitor connected across said switching circuit and said visual indicating means, operated to shunt initial loop current from said switching circuit, said capacitor further operated to discharge against said holding circuit upon termination of gated loop current.

8. A line circuit as claimed in claim 1, wherein: said switching circuit comprises an astable multivibrator.

9. A line circuit as claimed in claim 1, wherein: said telephone switching system includes a plurality of said multiple line telephones each connected to the same plurality of lines; said visual indicating means associated with each line, in each of said telephones, connected to said visual indicating means associated with the same line in each other of said telephones, whereby in each telephone, said visual indicating means associated with said selected line, operate in response to said periodically applied loop current to generate said periodic visual signal of said first characteristic.

* * * * *